Patented July 15, 1941

2,249,314

UNITED STATES PATENT OFFICE 2,249,314

AZO COLORED COMPOSITION

Joseph W. Lang, Woodstown, N. J., assignor to E. I. du Pont de Nemours & Company, Wilmington, Del., a corporation of Delaware No Drawing. Application January 31, 1940, Serial No. 316,516

7 Claims. (Cl. 134—58.5)

This invention relates to new color lakes and toners derived from the azo compound resulting from the coupling of diazotized 2-chlor-5-amino-toluene-4-sulfonic acid with beta naphthol, and especially to new mixed lakes of the kind which contain an alkali metal salt of the dye and an alkaline earth metal salt of the dye, both with and without a substratum and to processes of manufacturing the same.

It is among the objects of the invention to provide new color lakes and toners in orange shades which have unexpectedly strong tinting strength and uniform soft texture together with other desirable properties which are technically valuable for tinting various materials, such as plastic materials, printing inks, paints, wall paper coatings and cold water paints that are colored by admixing or grinding color lakes or toners into other materials. Another object of the invention is to provide processes for manufacturing the new compounds. A further object of the invention is to provide methods of varying the shade of the new compounds. Another object of the invention is to provide color lakes which disperse readily when milled in plastic compositions, such as rubber and rubber-like materials, do not migrate and do not show specks in milled material. Still other objects of the invention will be apparent from the following description.

The objects of the invention are attained in general by precipitating the alkali and alkaline earth salts of the azo compound in controlled proportions in substance or on a substratum and by heating the suspension under controlled conditions before it is isolated.

The invention will be more fully set forth in the following more detailed description which includes examples that are given as illustrative embodiments of the invention and not as limitations thereof. Parts are expressed in parts by weight unless otherwise noted.

Example 1

A solution was made by dissolving 222 parts of 2-chlor-5-amino-toluene-4-sulfonic acid in 2000 parts of water and 40 parts of caustic soda. The solution was heated to 70° C. and run into a slurry consisting of 40 parts water, 91 parts hydrochloric acid, 250 parts barium sulfate, and ice sufficient to cool the resulting suspension to 5° C. To this suspension were added 69 parts of sodium nitrite dissolved in 250 parts of water. When diazotization was complete any excess of nitrite was removed and the resulting solution of the diazo compound containing the barium sulfate was run into a solution of beta naphthol at 5° C. The beta naphthol solution consisted of 150 parts of beta naphthol dissolved in 1000 parts of water containing 64 parts of sodium hydroxide. The diazo suspension was slowly added to the beta naphthol solution over a period of about 5 to 10 minutes. The coupling medium was alkaline to phenolphthalein. Any excess of diazo compound in the mixture disappeared in a few minutes in the presence of the slight excess of the coupling component present and then a solution consisting of 61 parts of barium chloride crystals in 500 parts of water was added, the barium chloride being sufficient to lake about one-half of the sodium salt.

The mixture was stirred about one-half hour and then gradually heated to 75° C. while stirring so as not to cause local overheating, the heating to 75° C. requiring about one-half hour. The product was then separated from the liquid by filtration, washed free of alkali and dried, the yield being 668 parts.

This product was much softer in texture, much stronger in tinting value and much more readily incorporated into rubber than the soda salt lake made in the same way except that it was not after-treated with barium chloride. No specking was present in the rubber tinted with the new product and the color did not migrate. This product was much yellower in rubber than the barium salt lake of this dye which has a deep red shade. A mechanical mixture made by grinding together the sodium salt lake and the barium salt lake in proportions which gave a dry pigment having the same composition as the new product was weak in tinctorial value and it contained hard particles which induced a specky coloring when milled into rubber.

Example 2

A product was made as described in Example 1 except that no barium sulfate was added. The product was an orange shade and similar to the product of Example 1 with respect to its relatively high tinting value, uniform soft texture and dispersibility.

Similar results were obtained by heating the final suspension to temperatures of about 60° C. to about 90° C. Lower temperatures within this range gave yellower orange products and higher temperatures gave redder orange shades. When treated at temperatures below about 60° C. the texture of the products was too hard for the best results. Any soluble alkaline earth salt can be used instead of barium chloride, such as calcium chloride, strontium chloride, barium nitrate, and the soluble alkaline earth metal salt may be present in any of the solutions used in the process. Still other modifications of the process, such as more or less alkalinity of the coupling medium is possible, greater alkalinity of the coupling medium giving yellower shades. Stirring prior to heat treatment may also be widely varied from about one-half to twenty hours. Longer stirring gives yellower shades. The preferred embodiments of the invention are produced by using about one-half mol equivalent of the alkaline earth metal salt and under the conditions approximately like Example 1, but about one-fourth to three-fourths mol equivalent of the alkali metal can be used and incorporated in the product.

Instead of adding barium sulfate or another insoluble substratum to the reaction mixture, the substratum may be formed in the diazo solution or in the coupling medium from soluble salts of the substratum base metal and a precipitating agent, such as barium or strontium chloride and sodium sulfate. The substratum can also be added to the beta naphthol solution or added after the color is formed, but it is preferable to make the coupling in the presence of the substratum. The substratum may be present in any desired proportion. As a substratum any material of a soft texture which is insoluble in the laking media or the products to be colored by the lake and preferably of a shade that will not dull the shade of the resulting lake such as clay, talc, bentonite and even insoluble white metallic oxides and carbonates if they are not added to the acid diazo solution, can be used.

The reasons for the novel properties of the products are not fully understood. It is my present belief that crystals containing both the alkali metal and the alkaline earth metal salts of the dye are obtained and that such mixed crystals have different properties than the individual salts or mechanical mixtures thereof, thereby giving rise to the unexplainable differences in color, texture, dispersibility and hardness. When the soluble alkaline earth metal is dissolved in the final heat treating medium it is possible that an allotropic form of the alkali metal salt of the dye is formed and mixed crystals of the alkaline earth metal and alkali metal are produced. However, it is to be understood that the invention is not restricted to the foregoing theory.

From the foregoing disclosure it will be recognized that the invention is susceptible of modification without departing from the spirit and scope thereof and it is to be understood that the invention is not restricted to the specific illustrations thereof herein set forth.

I claim:

1. The process which comprises precipitating a mixture of alkali metal and alkaline earth metal salts of 2-hydroxy-naphthalene-1-azo-(3-methyl-4-chloro-benzene-6-sulfonic acid) in alkaline medium and modifying the precipitate by heating it to about 60° to 90° C. in the resulting medium until a product of uniform soft texture is produced which, upon separating from the medium and drying, is orange in shade and has higher tinting strength and softer texture than a dry mechanical mixture composed of the alkali metal salt of said monazo compound and the alkaline earth metal salt thereof which is of similar analytical composition.

2. In the process of making colored compositions containing alkali metal and alkaline earth metal combinations with 2-hydroxy-naphthalene-1-azo-(3-methyl-4-chloro-benzene-6-sulfonic acid), the steps which comprise precipitating an alkali metal salt of said monazo compound in an alkaline medium, stirring the slurry in the presence of a solution of a soluble alkaline earth metal salt, and then heating the resulting mixture to temperatures of about 60° C. to about 90° C. until a product of uniform soft texture is produced which, upon separating from the medium and drying, is orange in shade and has higher tinting strength and softer texture than dry mechanical mixtures composed of the alkali metal salt and the alkali earth metal salt of said monazo compound which are of similar analytical composition.

3. In the process of making colored compositions containing a substratum, an alkali metal and an alkaline earth metal combination with 2-hydroxy-azo-naphthalene-1-azo-(3-methyl-4-chloro-benzene-6-sulfonic acid), the steps which comprise precipitating the sodium salt of said monazo compound in a coupling medium made alkaline with sodium hydroxide, adding a solution of barium chloride proportioned in equivalency of about one-fourth to about three-fourths of the combined sodium, stirring, and heating the resulting mixture to temperatures of about 60° C. to about 90° C. until a product of uniform soft texture is produced which, upon separating from the medium and drying, is orange in shade and has higher tinting strength and softer texture than dry mechanical mixtures composed of the sodium and the barium lakes of said monazo compound which are of similar analytical composition.

4. The process which comprises coupling about 222 parts of diazotized 2-chlor-5-amino-toluene-4-sulfonic acid with about 150 parts of beta naphthol in the presence of sodium hydroxide and about 250 parts of barium sulfate, adding about 61 parts of barium chloride, stirring for about one-half hour, gradually heating while stirring so as to raise the temperature to about 75° C. in about one-half hour, and then separating the product from the reaction mixture.

5. The product obtainable by precipitating a mixture of alkali metal and alkaline earth metal salts of 2-hydroxy-naphthalene-1-azo-(3-methyl-4-chloro-benzene-6-sulfonic acid) in alkaline medium and modifying the precipitate by heating it to about 60° C. to 90° C. in the resulting medium until a product of uniform soft texture is produced which, upon separating from the medium and drying, is orange in shade and has higher tinting strength and softer texture than a dry mechanical mixture composed of an alkali metal salt of said monazo compound and an alkaline earth metal salt thereof which is of similar analytical composition.

6. The product comprising a substratum, an alkali metal and an alkaline earth metal combined with the product of coupling diazotized 2-chlor-5-amino-toluene-4-sulfonic acid with beta naphthol in the presence of an alkali metal hydroxide which is obtainable by forming the alkali metal salt of said monazo compound, adding a water soluble salt of said alkaline earth metal, said alkaline earth metal being proportioned in equivalency of about one-fourth to about three-fourths of the combined alkali metal, stirring and heating the resulting mixture to temperatures of about 60° C. to about 90° C. until a product of uniform soft texture is produced which, upon separating from the medium and drying, is orange in shade and has higher tinting strength and softer texture than a dry mechanical mixture composed of the alkali metal salt and the alkaline earth metal salt lake having like analytical composition.

7. The product comprising a substratum of barium sulfate and a composite sodium and barium salt of the product of coupling diazotized 2-chlor-5-amino-toluene-4-sulfonic acid with beta naphthol in the presence of sodium hydroxide which is obtainable by forming the sodium salt of said monazo compound in the presence of said substratum, adding barium chloride to the resulting medium, said barium chloride being proportioned in equivalency to about one-half of the combined sodium, stirring for about one-half hour, gradually heating while stirring the mixture during a period of about one-half hour until the temperature thereof is about 75° C., and then separating the product from the reaction mixture.

JOSEPH W. LANG.